(12) United States Patent
Uyeno et al.

(10) Patent No.: US 9,473,768 B2
(45) Date of Patent: Oct. 18, 2016

(54) OPTICAL NON-UNIFORMITY CORRECTION (NUC) FOR ACTIVE MODE IMAGING SENSORS

(71) Applicant: Raytheon Company, Waltham, MA (US)

(72) Inventors: Gerald P. Uyeno, Tucson, AZ (US); Sean D. Keller, Tucson, AZ (US); David D. Acton, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 16 days.

(21) Appl. No.: 14/476,199

(22) Filed: Sep. 3, 2014

(65) Prior Publication Data

US 2016/0065956 A1   Mar. 3, 2016

(51) Int. Cl.
*A62B 1/04*  (2006.01)
*H04N 17/00*  (2006.01)

(52) U.S. Cl.
CPC ............... *H04N 17/002* (2013.01); *A62B 1/04* (2013.01)

(58) Field of Classification Search
CPC ............................... H04N 17/002; A62B 1/04
USPC ........................................ 348/67, 68, E9.206
See application file for complete search history.

(56) References Cited

U.S. PATENT DOCUMENTS

| | | | |
|---|---|---|---|
| 4,602,291 A | 7/1986 | Temes | |
| 5,047,861 A | 9/1991 | Houchin et al. | |
| 6,476,970 B1 | 11/2002 | Smith | |
| 7,335,898 B2 * | 2/2008 | Donders | G02B 21/0036 250/458.1 |
| 7,570,320 B1 | 8/2009 | Anderson et al. | |
| 8,380,025 B2 | 2/2013 | Anderson et al. | |
| 8,463,080 B1 | 6/2013 | Anderson et al. | |
| 2013/0021474 A1 | 1/2013 | Taylor et al. | |

OTHER PUBLICATIONS

Palmer et al., The Art of Radiometry, Chapter 2.3, SPIE Press Book, 2009.

* cited by examiner

*Primary Examiner* — Paulos M Natnael
*Assistant Examiner* — Omer Khalid
(74) *Attorney, Agent, or Firm* — Eric A. Gifford

(57) ABSTRACT

Optical non-uniformity correction (NUC) of an active mode image sensor scans a spot over a portion of the sensor's FOV within a frame time so that the net response of the sensor is approximately uniform. Scanning the laser spot simultaneously performs the NUC and provides the illumination of the FOV for imaging the scene. The laser spot is suitably scanned in an overlapping geometrical pattern relative to a line-of-sight of the sensor's imager while modulating a spacing between overlapping laser spots, the size of the spot, a dwell time of the laser spot or the energy of the laser spot or combinations thereof as a function of the scan position of the laser spot so that the laser illumination is inversely proportional to the imager response at the scan position of the laser spot. A liquid crystal waveguide may be used to form and scan the small laser spot over the FOV within the frame time.

13 Claims, 11 Drawing Sheets

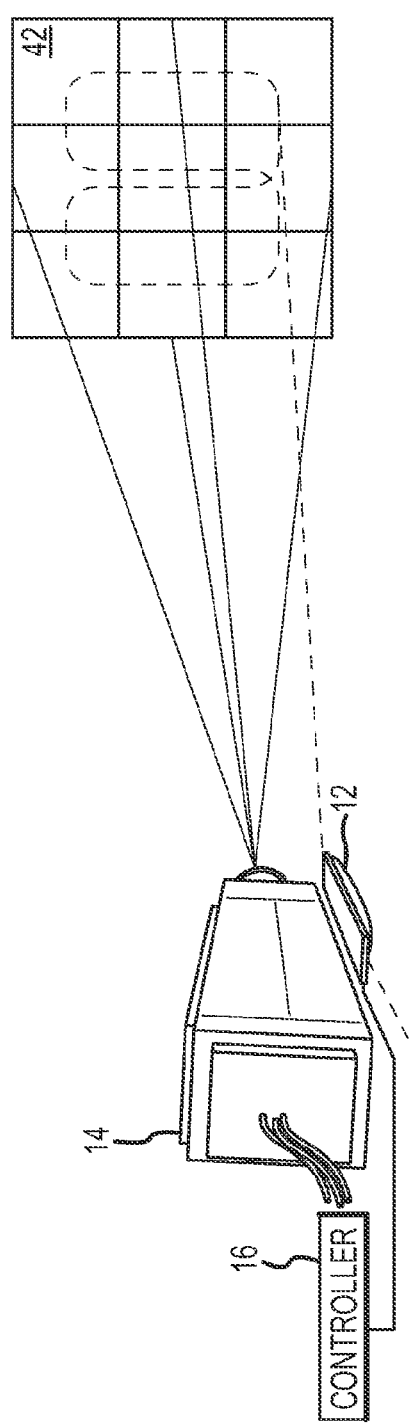
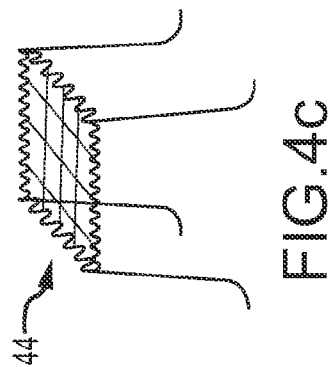
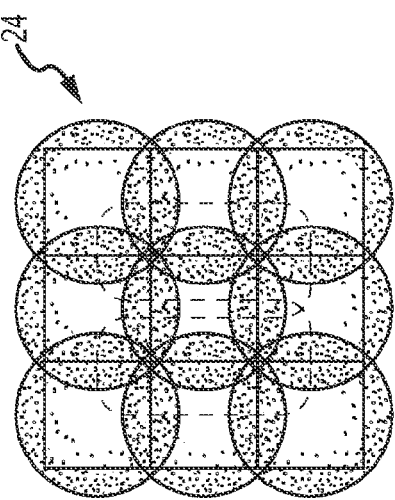
FIG. 4a
FIG. 4b
FIG. 4c

OPTICAL NON-UNIFORMITY CORRECTION (NUC) FOR ACTIVE MODE IMAGING SENSORS

BACKGROUND OF THE INVENTION

1. Field of the Invention

This invention relates to optical non-uniformity correction (NUC) for active mode imaging sensors, and more particularly to optical NUC for angle of incidence between the scene and imager.

2. Description of the Related Art

Imaging sensors typically include a pixelated imager that is sensitive to incident photons within a certain spectral band e.g. Near IR (NIR), Short Wave IR (SWIR), Mid Wave IR (MWIR), Long Wave IR (LWIR), visible etc., imaging optics having an entrance pupil for receiving light from a scene within a field-of-view (FOV) of the sensor and imaging the FOV onto the imager, and a read out circuit for reading out an image of the FOV within the spectral band at a frame rate. The scene is composed of multiple point sources of light (collimated due to the distance to the scene) at different angles of incidence. The optics focus light from each point source onto the pixelated imager with the angle of incidence mapping to a spatial offset on the imager to form the image. Passive mode sensors detect emissions from the scene in the spectral band of the imager. Active mode sensors use a broad beam laser illuminator to illuminate the scene within the FOV of the sensor with laser energy in the spectral band to increase the signal-to-noise ratio (SNR). Generally, objects that emit in the spectral band will also reflect illumination of that band so there will be more signal from the object compared to the background.

Ideally an imaging sensor should respond uniformly across its FOV. That is the sensor response to a point source of illumination anywhere in the FOV should be the same. However, due to manufacturing issues of the pixelated imager, environmental variations and the radiometry of point sources, there are non-uniformities that exist in imaging sensors that must be corrected. Fixed pattern noise describes the non-uniformity in the response of the individual pixels of the imager itself. Notwithstanding the name, the fixed pattern noise can change with time and operating conditions such as temperature.

The irradiance at the entrance pupil of the imager from isotropic point sources across a plane varies with the $3^{rd}$ power of the cosine of the angle of incidence from the optical axis of the imager to the point source. For a Lambertian point source (such as laser light reflected off objects in a scene), the irradiance varies with the $4^{th}$ power of the cosine (See Chapter 2.3 Radiometric Approximations of The Art of Radiometry, SPIE Press Book, 2009). The angle may have a first component owing to the LOS from the imager to the scene and a second component owing to the spatial position of a point source within the FOV. The $3^{rd}$ or $4^{th}$ power of the cosine functions rolls off rapidly with the angle of incidence. Without correction, the sensor response will be highly non-uniform over the FOV, particularly if the LOS angle is appreciable.

Non-Uniformity Correction (NUC) may be performed as a calibration step at the time of manufacture and periodically in a laboratory setting. A black body source is used to produce flat field illumination across the sensor's FOV. The sensor's response is measured and used to calculate a scale factor for each pixel that is inversely proportional to that pixel's response so that the net response of the sensor is uniform over the FOV. This accounts for both fixed pattern noise and angle of incidence roll off over the FOV. Thereafter, the measured value for each pixel is multiplied by its scale factor, a form of "electronic" gain. An undesirable effect is scaling (increasing) the noise.

It is often desirable to periodically perform a NUC in an operational setting. To accomplish this the imaging sensor is provided with a black body source e.g. a small thermal source to provide flat field illumination. The sensor's response is measured and used to update the scale factors for each pixel. The operational NUC may account for changes in the fixed pattern noise or angle of incidence due to the LOS from the imager to the scene. In many applications, the LOS is constantly changing. The imaging sensor will lose visibility of the scene during NUC.

Another approach is to utilize a scene-based NUC in which the sequence of images (frames) are filtered and compared to determine and correct the non-uniformity. Scene-based NUC requires the post-processing of frames for filtering and comparison to previous frames. This process is computationally demanding and uses statistics to determine the non-uniformity of the scene, which could introduce errors in the final image. Scene-based NUC maintains visibility of the scene during NUC.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method of optical non-uniformity correction (NUC) of an active mode sensor that includes a laser illuminator and a pixelated imager with optics having an entrance pupil.

In an embodiment, the laser illuminator transmits and scans a laser spot that is smaller than the sensor's field of view (FOV) over a portion of the FOV so that the net response of the sensor is approximately uniform over the scanned portion of the FOV. The scanned portion may be the entire FOV or a local region of the FOV.

In an embodiment, the laser spot is scanned over the portion of the FOV within a frame time. The pixelated imager detects the laser spot's reflected energy of that portion of a scene, which is read out each frame time. The scanned laser spot simultaneously performs the NUC and provides the illumination of the FOV for imaging the scene. As a result, visibility of the scene is not lost during NUC and an additional black body source is not required for NUC. By limiting noise scaling, optical NUC improves the SNR in the NUC'd image.

In an embodiment, the scanned laser spot forms a point source in the scene at an angle of incidence to the entrance pupil. The response of the pixelated imager falls off as a function of an increasing angle of incidence. The laser spot is scanned so that the laser illumination is inversely proportional to the imager response at the scan position of the laser spot. In an embodiment, the point source is Lambertian and the image response falls off approximately as the $4^{th}$ power of the cosine of the angle of incidence.

In an embodiment, the laser spot is scanned in an overlapping geometrical pattern relative to a line-of-sight of the imager over the FOV within a frame time while modulating as a function of the scan position of the laser spot a spacing between overlapping laser spots, the size of the spot, a dwell time of the laser spot or the energy of the laser spot or combinations thereof so that the laser illumination is inversely proportional to the imager response at the scan position of the laser spot.

In an embodiment, the illuminator comprises a liquid crystal waveguide configured to form the laser energy into a laser spot smaller than the FOV and to scan the laser spot over a portion of the FOV within a frame time so that a net response of the sensor is approximately uniform over the scanned portion of the FOV for each frame time. The LCWG has a core and at least one cladding, liquid crystal material within said at least one cladding and at least one electrode and a ground plane on opposite sides of the liquid crystal material. The at least one electrode is configured to receive at least one time-varying voltage to vary an electric field to induce the liquid crystal material to form a time-varying refractive shape to form and scan the laser spot over the FOV.

In an embodiment, the laser spot is scanned to increase the SNR in a local region of the FOV.

In an embodiment, the pixel imager has a fixed pattern noise. The laser spot size is formed with size of an individual pixel and scanned to compensate for the fixed pattern noise in a local region of the FOV.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a, 4b and 4c are diagrams illustrating an active mode sensor that scans a laser spot over the sensor FOV to produce a net sensor response that is approximately uniform over the FOV;

DETAILED DESCRIPTION OF THE INVENTION

An optical non-uniformity correction (NUC) of an active mode sensor scans a spot over a portion of the sensor's FOV within a frame time so that the net response of the sensor is approximately uniform. Scanning the laser spot simultaneously performs the NUC and provides the illumination of the FOV for imaging the scene. The response of the sensor's imager will fall off with an increasing angle of incidence. In some cases, the illuminated portion of the scene will form a Lambertian point source whose illuminations rolls off as the $4^{th}$ power of the cosine of the angle of incidence. The angle of incidence may include a variable line-of-sight (LOS) component from the imager to the scene and a fixed FOV component across the scene within the FOV. The laser spot is suitably scanned in an overlapping geometrical pattern relative to a line-of-sight of the sensor's imager while modulating a spacing between overlapping laser spots, the size of the spot, a dwell time of the laser spot or the energy of the laser spot or combinations thereof as a function of the scan position of the laser spot so that the laser illumination is inversely proportional to the imager response at the scan position of the laser spot. A liquid crystal waveguide may be used to form and scan the small laser spot over the FOV within the frame time.

Optical NUC of active mode sensors has several advantages when compared to the conventional electronic NUC. First, the scanned laser spot simultaneously provides both the NUC and the active illumination of the scene. Therefore, the additional black body source usually required for NUC during operation is not needed. Second, because the NUC and active illumination are coincident, visibility of the scene is not lost to perform the NUC. Third, scanning a spot allows one to achieve the same SNR with less total power or greater SNR with the same total power of flood or flash illumination. Fourth, optical NUC limits noise scaling. Instead of multiplying the noise, an increase in optical power increases the noise as a square root. As a result, the NUC'd image will have an even higher SNR. The SNR advantage may be quite pronounced for Lambertian point sources whose illumination rolls off as the $4^{th}$ power of the cosine of the angle of incidence, particularly in cases where the LOS component is significant.

Figure 1:
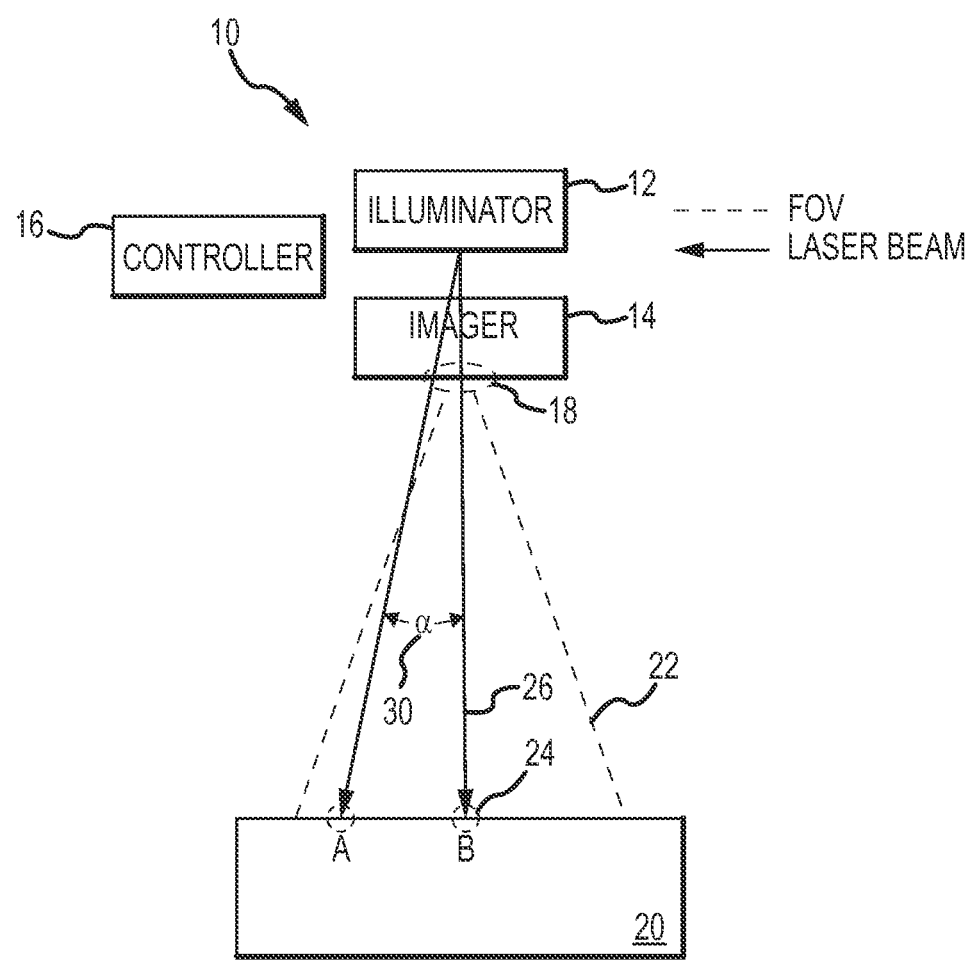
FIG. 1 is a block diagram of an embodiment of an active mode sensor including a laser illuminator and an imager.
Figure 2:
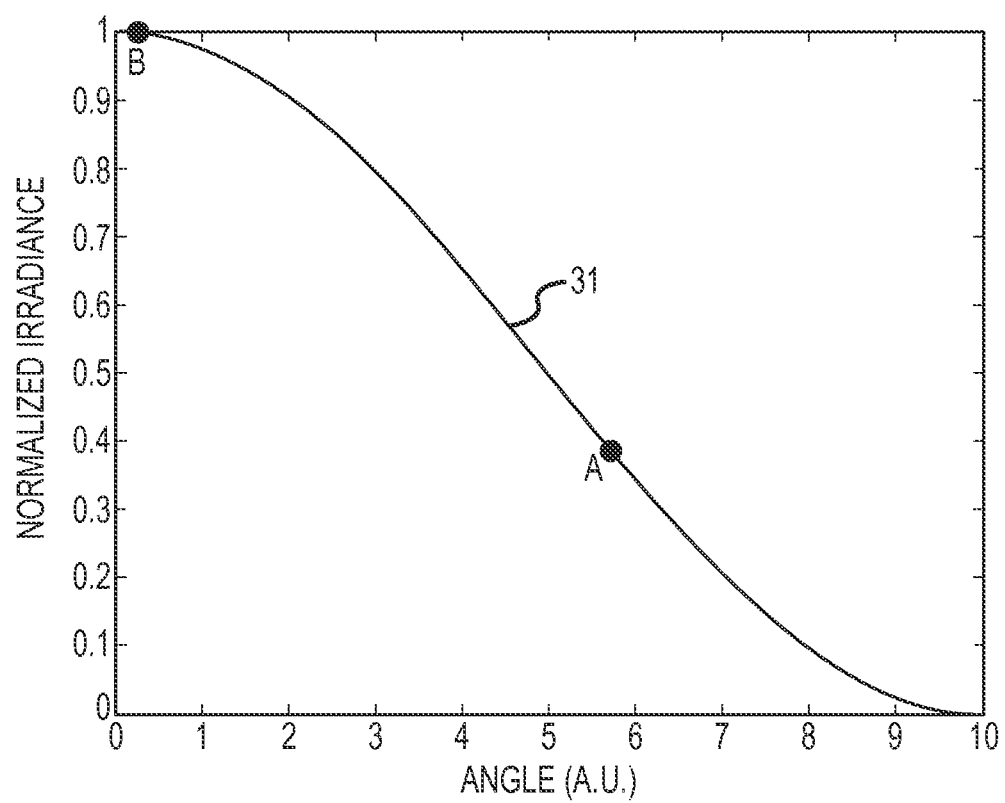
FIG. 2 is a plot of normalized irradiance versus angle of incidence.

Referring now to FIGS. 1 and 2, an embodiment of an active mode imaging sensor 10 includes a laser illuminator 12, an imager 14 and a controller 16. For simplicity the laser illuminator 12 is co-boresighted with the pixelated imager 14. If illuminator is not co-boresighted it will induce a bias to the angle than can be corrected with measured ranges. Imager 14 includes optics having an entrance pupil 18 configured to receive reflected light from a laser illuminated scene 20 over a FOV 22 and image the light onto the pixelated imager. Laser illuminator 12 is configured to scan a laser spot 24 over FOV 22 within a frame time. Controller 16 controls the laser illuminator to scan the laser spot.

As shown in FIG. 1, in this embodiment a LOS 26 from the sensor to scene is normal to scene 20. Hence, the LOS does not contribute to the angle of incidence α 30. Therefore, a point source at the center B of FOV 22 has a zero angle of incidence. A point source at a position A in FOV 22 has an angle of incidence determined by its position in the FOV. Assuming Lambertian point sources, the normalized radiance 31 received at the entrance pupil of the imager decreases as the $4^{th}$ power of the cosine of the angle of incidence α 30. In general, the LOS from the sensor to the scene will contribute to the angle of incidence. For example, if the LOS is 20 degrees, the point source at the center B of the FOV will be at 20 degrees on the normalized radiance plot and the point source at position A will be offset from that position. Typical FOV may be 2-8 degrees (+/−1-4 degrees) for tracing, but larger for surveillance applications.

Figure 3:
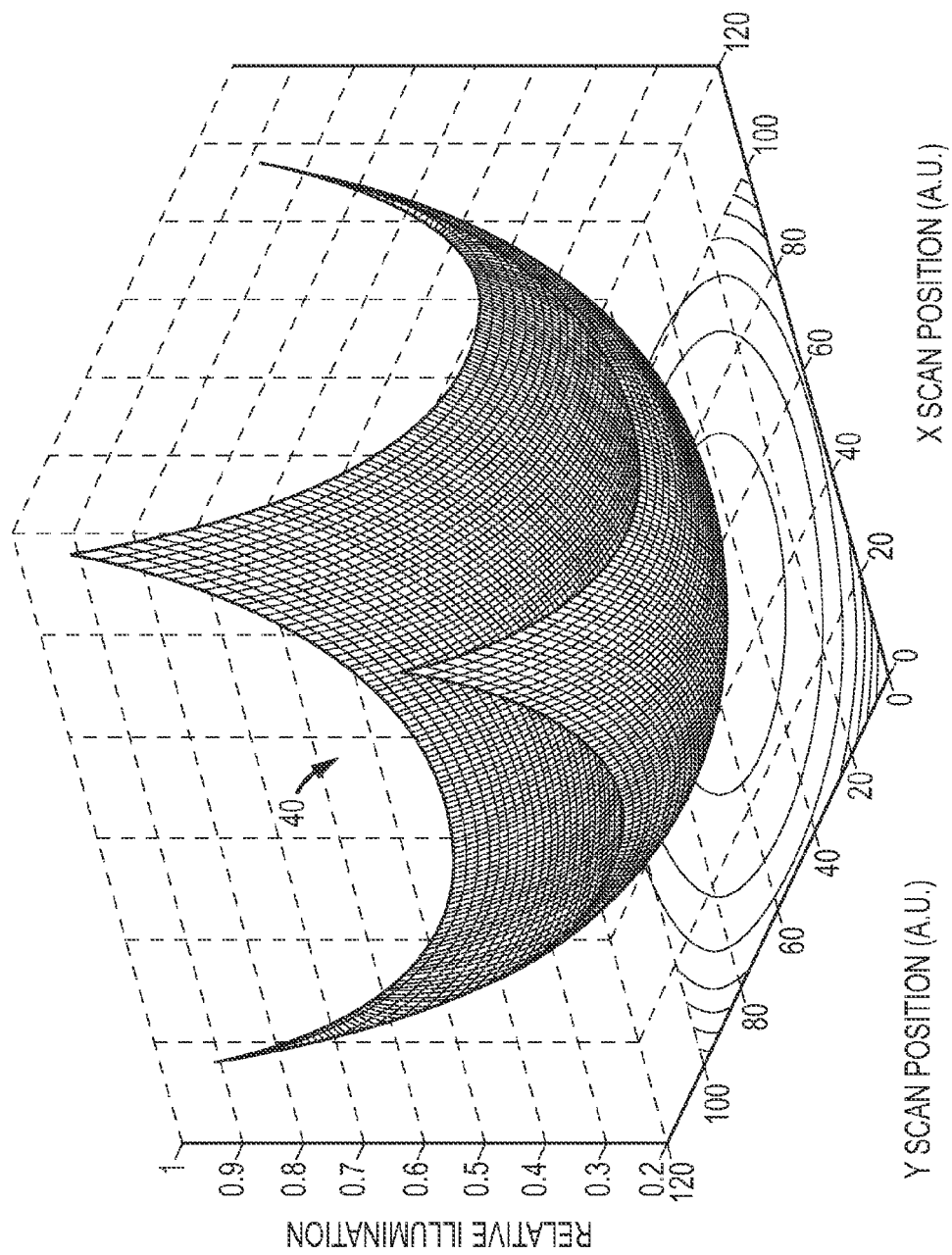
FIG. 3 is a plot of relative illumination as a function of scan position (angle of incidence) in the scene to provide approximately uniform sensor response.

As shown in FIG. 3, to correct for the roll off in normalized radiance due to the radiometry of the angle of incidence of Lambertian point sources, the laser illuminator scans the laser spot over the FOV to a relative illumination 40 that is inversely proportional to the response of the pixelated imager at the scan position of the laser spot. The spot size and scan pattern will determine how closely the actual illumination over the FOV will approximate the ideal relative illumination 40. Smaller spots sizes may more accurately reproduce the desired illumination. However, small spot sizes are more difficult to form and require higher scan rates to cover the FOV, or a portion thereof, in a certain frame time. Technologies including but not limited to liquid crystal waveguides, optical phased arrays and mechanical scanning mirrors may be configured to form and scan the laser spot. Typical, spot sizes may be between 2 and 25% of the FOV.

As shown in FIG. 4a-4c, controller 16 controls laser illuminator 12 to transmit and scan laser spot 24 in an fixed overlapping geometrical pattern 42 relative to the LOS of the imager over FOV 22 within a frame time to provide a relative illumination that is inversely proportional to the imager response and thereby provide a net response 44 of the sensor that is approximately uniform over the FOV or a scanned portion thereof. The pattern may be fixed relative to the LOS or varied based on an external input such as to highlight a certain local region within the FOV.

The imager response may be determined by the angle of incidence owing to the LOS from the imager to the scene or to spatial variations across the FOV or both. In some cases the imager response could be a known fixed pattern noise. In this case, the spot size would be set to the pixel size. Due to possible scan rate limitations, correction for fixed pattern noise may be limited to local regions of the FOV and not available over the entire FOV. Other sources of non-uniformity such as temperature, detector lifetime, or the like may exists. As long as the non-uniformity can be characterized, the scan pattern of the laser spot may be adapted to correct for that non-uniformity.

Figure 5:
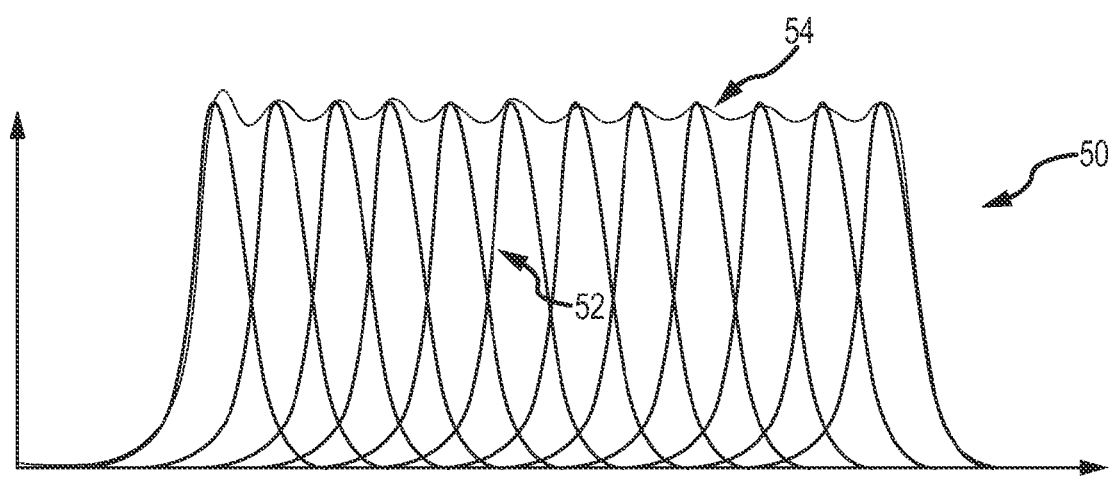
FIG. 5 is a plot of a scan pattern having a nominal spacing, amplitude and dwell time that sum to provide approximately uniform relative illumination over the sensor FOV.

Referring now to FIGS. 5 and 6a through 6d, there exist multiple parameters of the laser spot and overlapping scan pattern that may be controlled individual or in combination to produce the relative illumination to provide optical NUC. FIG. 5 depicts an overlapping scan pattern 50 of a laser spot 52 configured to produce an approximately uniform illumination 54 over the FOV within a frame time. In this scan pattern, the spacing, size, energy and dwell time of the laser spot 52 all have nominal and fixed values throughout the scan pattern 50. The desired relative illumination is approximated by varying one or more of these parameters over the scan pattern as a function of the scan position of the laser spot.

Figure 6A:
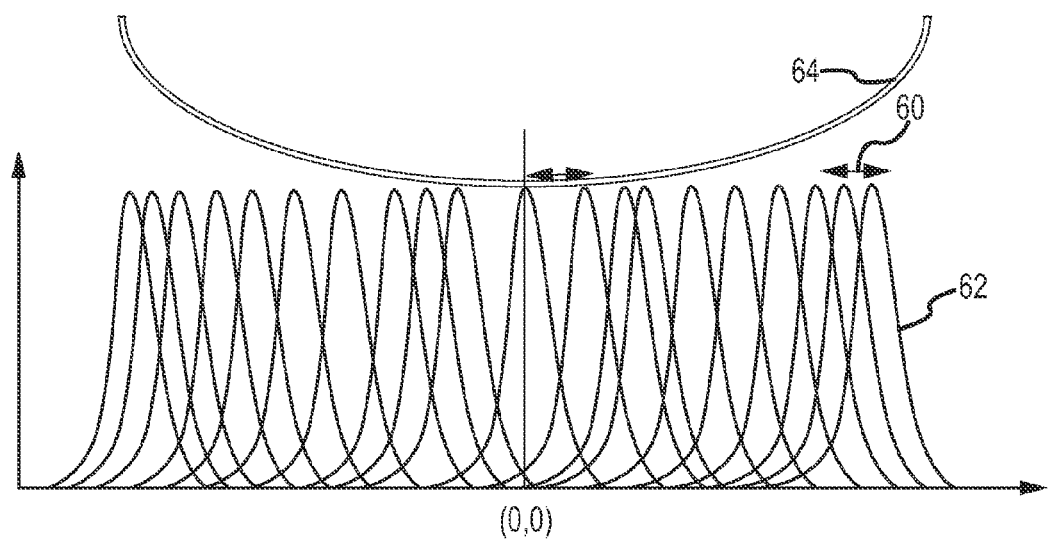
FIGS. 6a, 6b, 6c and 6d are different embodiments that illustrate controlled spacing, spot size, amplitude and dwell time that sum to provide relative illumination as function of scan position to provide an approximately uniform sensor response over the FOV.

As shown in FIG. 6a, a spacing 60 between laser spots 62 is varied as a function of scan position to produce a relative illumination 64 that is inversely proportion to the imager response. The spacing 60 gets closer and closer together as the scan position from the center of the FOV increases, hence angle of incidence to the imager's entrance pupil increases so that the laser spots 62 sum together to provide more illumination.

Figure 6B:
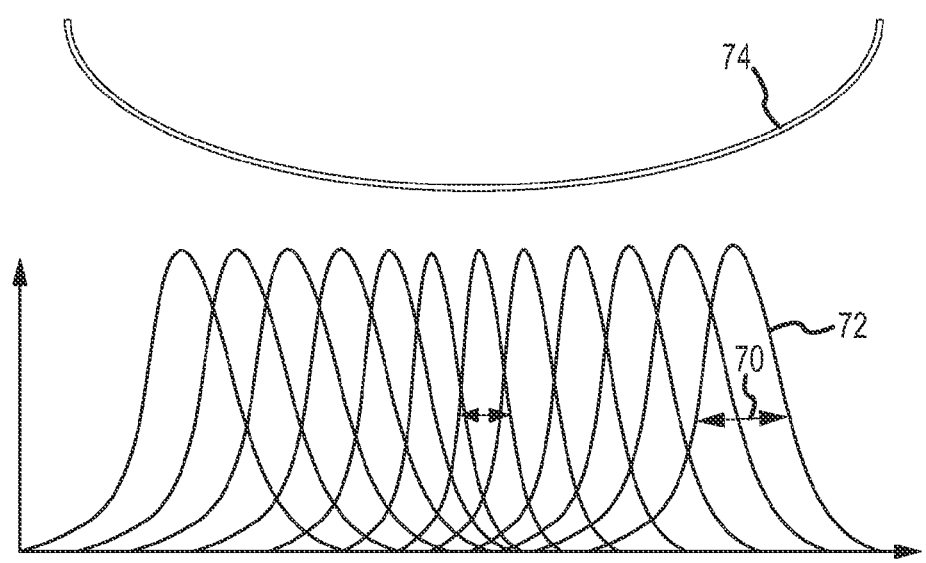

As shown in FIG. 6b, a size (width) 70 between laser spots 72 is varied as a function of scan position to produce a relative illumination 74 that is inversely proportion to the imager response. The size 70 gets wider and wider as the scan position from the center of the FOV, hence angle of incidence to the imager's entrance pupil increases so that the laser spots 72 sum together to provide more illumination.

Figure 6C:
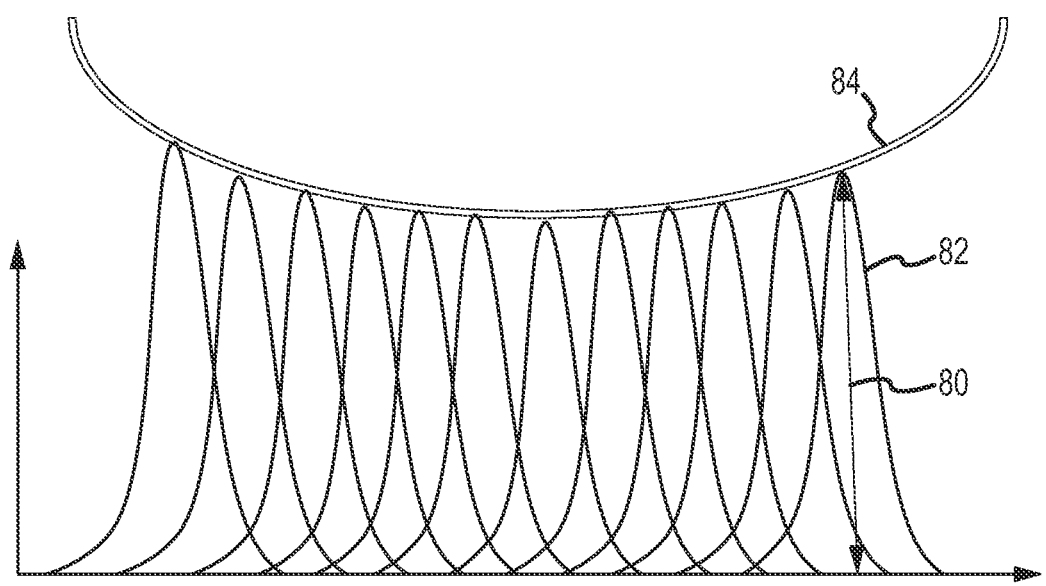

As shown in FIG. 6c, an amplitude 80 of a laser spot 82 is varied as a function of scan position to produce a relative illumination 84 that is inversely proportion to the imager response. The amplitude 80 gets larger and larger as the scan position from the center of the FOV increases, hence angle of incidence to the imager's entrance pupil increases so that the laser spots 62 sum together to provide more illumination.

Figure 6D:
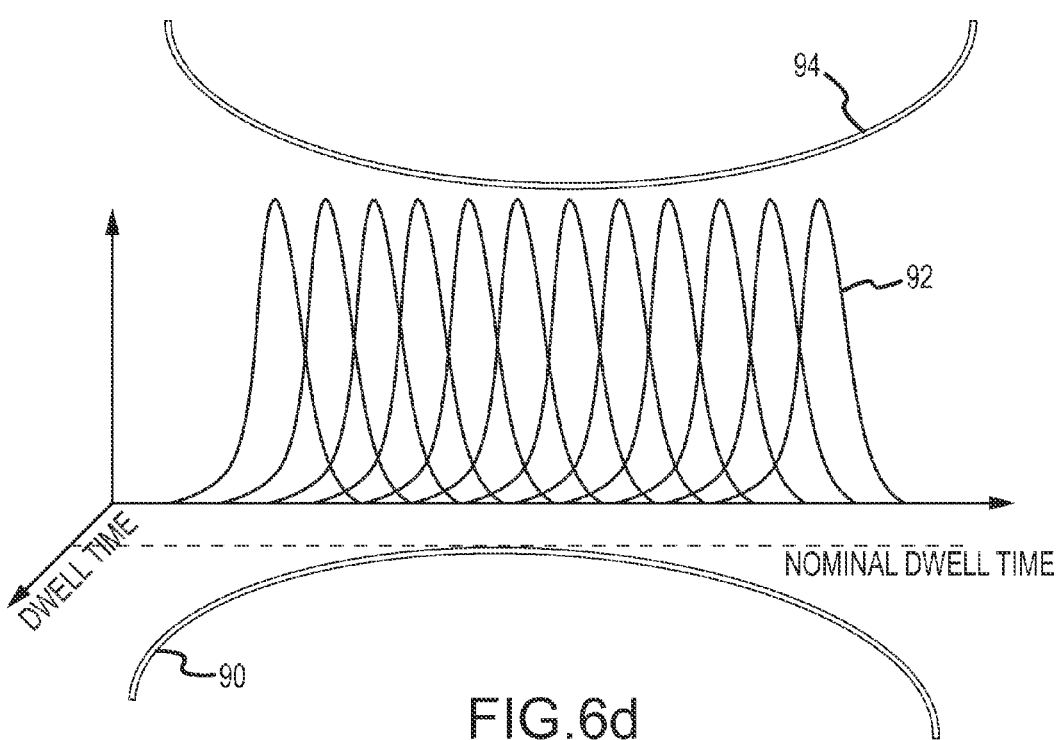

As shown in FIG. 6d, a dwell time 90 of a laser spot 92 is varied as a function of scan position to produce a relative illumination 94 that is inversely proportion to the imager response. The dwell time 90 gets longer and longer as the scan position from the center of the FOV increases, hence angle of incidence to the imager's entrance pupil increases so that the laser spots 94 sum together to provide more illumination.

Multiple parameters may be controlled to provide the desired relative illumination for each frame time. For example, the laser power (amplitude of the laser spot) may be varied to correct for the LOS component of the angle of incidence. In some cases, the LOS component may vary relative slowly allowing for direct control of laser power. One of the other parameters i.e. spacing, spot size or dwell time may be varied to correct for the FOV component of the angle of incidence. The FOV component may vary relative quickly with the scan rate within each frame time.

Figure 7:
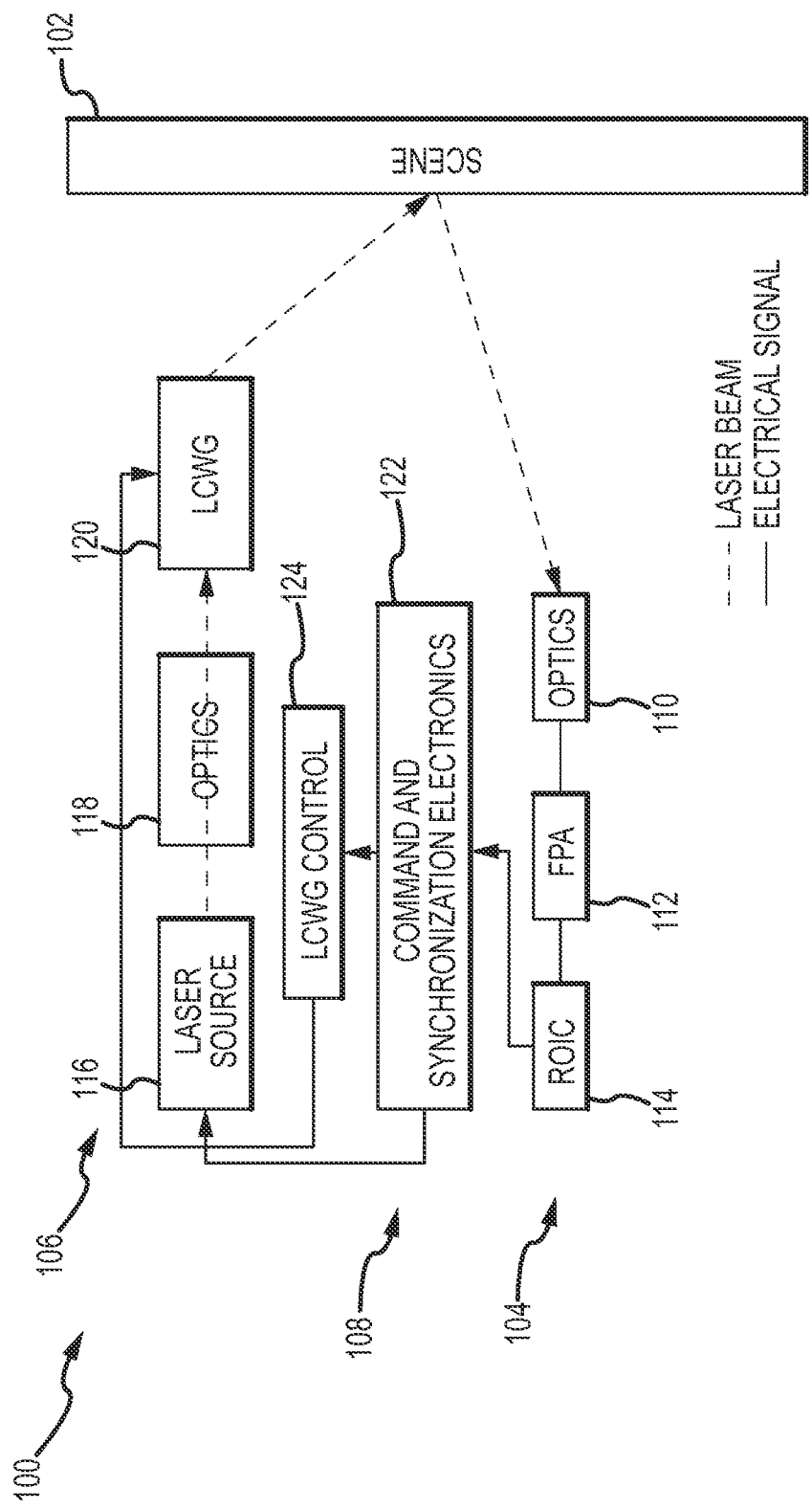
FIG. 7 is a block diagram of an embodiment of the active mode sensor including a liquid crystal waveguide for scanning the spot.
Figure 8:
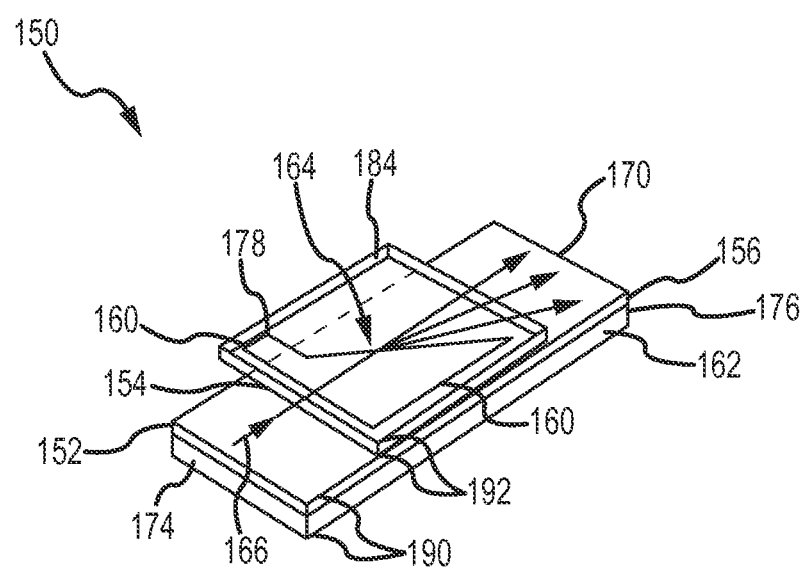
FIG. 8 is a diagram of an embodiment of a liquid crystal waveguide.

Referring now to FIGS. 7 and 8, an embodiment of an active mode imaging sensor 100 for reading out NUC'd images of a scene 102 at a frame time includes an imager 104, an illuminator 106 and a controller 108.

Imager 104 includes optics 110, a focal plane array (FPA) 112 and a read out integrated circuit (ROIC) 114. Optics 110 have an entrance pupil configured to receive reflected light from the laser illuminated scene over a FOV and image the light onto the FPA, which accumulates the incident photons over a frame time. The FPA may be Silicon based for visible and NIR applications, InGaAs for SWIR, HgCdTe for MWIR or a bolometer configuration for LWIR. The ROIC reads out a NUC'd image every frame time.

Illuminator 106 includes a laser source 116, optics 118 and a liquid crystal waveguide (LCWG) 120. Laser source 116 supplies laser energy in a specified spectral band. Optics 118 couple the laser energy to the liquid crystal waveguide. The liquid crystal waveguide responds to high frequency voltage drive signals to form the laser energy into a laser spot and to scan the spot in an overlapping scan pattern to provide a specified relative illumination over the FOV, or a portion of the FOV, in a frame time.

Controller 108 includes a command and synchronization electronics 122 that receives a start of frame/row from the ROIC 114 and generates analog drive signals that specific the scan pattern and a LCWG controller 124 that converts the analog drive signals to the high frequency high voltage drive signal applied to the LCWG 120. These command and synchronization electronics 122 may also synchronize the pulses from the laser source 116. Asynchronous laser pulse operation is possible.

As previously discussed, the angle of incidence, hence FPA response, includes a LOS component and a FOV component. The FOV component can be calculated directly by knowing the scan position of the laser spot within the FOV. The LOS may be provided by an external source to the sensor e.g. telemetry on board a missile. Alternately, the LOS component may be corrected by essentially turning up the nominal relative illumination until the dynamic range of the FPA is utilized but not saturated. Assuming that the frame rate is much larger than the change in the LOS, intensity measurements from one frame can be used to adjust the nominal relative illumination in the next frame. This "feedback" technique can be used to track and correct the LOS component.

U.S. Pat. No. 8,380,025 entitled "Liquid Crystal Waveguide Having Refractive Shapes for Dynamically Controlling Light" assigned to Vescent Photonics, Inc. discloses a LCWG that is configurable to form and scan a laser spot over a FOV in a frame time to provide a relative illumination for optical NUC of active mode image sensors. A time varying voltage is applied to the LCWG to transform the liquid crystal material into a refractive shape to form and position the laser spot according to the specified scan pattern.

Liquid crystal waveguides dynamically control the refraction of light. Generally, liquid crystal materials may be disposed within a waveguide in a cladding proximate or adjacent to a core layer of the waveguide. In one example, portions of the liquid crystal material can be induced to form refractive optical component shapes (e.g. lenses or prisms) in the cladding that interact with a portion (specifically the evanescent field) of light in the waveguide so as to permit electronic control of the refraction/bending, focusing, or defocusing of light as it travels through the waveguide. In one example, a waveguide may be formed using one or more patterned or shaped electrodes that induce formation of such refractive shapes of liquid crystal material, or alternatively, an alignment layer may have one or more regions that define such refractive or lens shapes to induce formation of refractive or lens shapes of the liquid crystal material. In another example, such refractive shapes of liquid crystal material may be formed by patterning or shaping a cladding to define a region or cavity to contain liquid crystal material in which the liquid crystal materials may interact with the evanescent light.

As shown in FIG. 8, the waveguide 150 may be generally rectangular in shape and may include a core 152 having a generally rectangular cross-section or defining a parallel piped between walls 172. On the front end 174 of the waveguide 150, light 166 is introduced into the waveguide core 154 and propagates along the length of the waveguide 150 to the distal end 176 of the waveguide 50. As shown in FIG. 8, the direction of propagation of light 166 through the waveguide 150 is generally along the length of the waveguide 150, and use of embodiments of the present invention permit the output propagation direction or angle 170 to be controllably altered depending, in part, on the shapes of the upper electrodes 160 and the voltages 168 applied between the upper electrodes 160 and the lower electrode or ground plane 62. Although the waveguide 150 in FIG. 1 is shown as generally rectangular, it is understood that a waveguide made according to one or more embodiments of the present invention could have other shapes such as square, trapezoid, parallelogram, any polygon, or even be diced or scribed so as to have rounded edges producing elliptical, circular, or any curved shape.

In one example, the patterned electrode(s) 160 may include a tab or extension therefrom 178 which permits the patterned electrode(s) to be electrically connected to other electrical elements, such as a voltage source 168 coupled between the patterned electrode 160 and the lower electrode or plane 162. Alternatively, electrical traces, conductors, vias or other conventional connection types may be utilized instead of or with tab 178 to electrically couple a patterned electrode 160 to other electrical elements.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of optical non-uniformity correction (NUC) of an active mode imaging sensor having a non-uniform response over a field-of-view (FOV), the method comprising:
   transmitting a laser spot that is smaller than the sensor's field of view (FOV);
   scanning the laser spot over a portion of the FOV; and
   modulating as a function of the scan position of the laser spot a spacing between overlapping laser spots, a size of the laser spot, a dwell time of the laser spot or the energy of the laser spot or combinations thereof so that the laser illumination is inversely proportional to the response of the imaging sensor at the scan position of the laser spot to correct for the sensor's non-uniform response over the scanned portion of the FOV.

2. The method of claim 1, wherein the laser spot is scanned over the portion of the FOV in a frame time, further comprising:
   reading out a NUC'd image from the sensor at each frame time.

3. The method of claim 1, wherein the sensor comprises a laser illuminator that generates the laser spot, a pixelated imager and optics having an entrance pupil, wherein the laser spot illuminates a portion of a scene thereby forming an approximately Lambertian point source at an angle of incidence to the entrance pupil, whereby a response of the pixelated imager falls off approximately as the $4^{th}$ power of the cosine of the angle of incidence, wherein the laser spot is scanned over the FOV so that the laser illumination is inversely proportional to the response of the pixelated imager at the scan position of the laser spot.

4. The A method of optical non-uniformity correction (NUC) of an active mode imaging sensor having a field-of-view (FOV), wherein the sensor comprises a laser illuminator that generates a laser spot, a pixelated imager and optics having an entrance pupil, wherein the laser spot illuminates a portion of a scene thereby forming an approximately Lambertian point source at an angle of incidence to the entrance pupil, whereby a response of the pixelated imager falls off approximately as the $4^{th}$ power of the cosine of the angle of incidence, the method comprising:
   transmitting a laser spot that is smaller than the sensor's field of view (FOV);
   scanning the laser spot over a portion of the FOV so that a net response of the sensor is uniform over the scanned portion of the FOV, wherein the laser spot is scanned in an overlapping geometrical pattern relative to a line-of-sight of the imager over the FOV within a frame time while modulating as a function of the scan position of the laser spot a spacing between overlapping laser spots, a size of the laser spot, a dwell time of the laser spot or the energy of the laser spot or combinations thereof so that the laser illumination is inversely proportional to the response of the pixelated imager at the scan position of the laser spot.

5. The method of claim 4, further comprising controlling a liquid crystal waveguide to form laser energy into the laser spot and to scan the laser spot over the FOV within the frame time.

6. The method of claim 5, wherein the liquid crystal waveguide comprises a core and at least one cladding, liquid crystal material within said at least one cladding and at least one electrode and a ground plane on opposite sides of the liquid crystal material, wherein controlling the LCWG comprising applying at least one time-varying voltage to the at least one electrode to vary an electric field to induce said liquid crystal material to form a time-varying refractive shape to form and scan the laser spot over the FOV.

7. A method, of optical non-uniformity correction (NUC) of an active mode imaging sensor having a field-of-view (FOV), wherein the sensor comprises a laser illuminator that generates the laser spot, a pixelated imager and optics having an entrance pupil, wherein the laser spot illuminates a portion of a scene thereby forming an approximately point source at an angle of incidence to the entrance pupil, whereby a response of the pixelated imager falls off as a function of an increasing angle of incidence, the method comprising:

transmitting a laser spot that is smaller than the sensor's field of view (FOV);

scanning the laser spot over a portion of the FOV so that the laser illumination is inversely proportional to the response of the pixelated imager at the scan position of the laser spot so that a net response of the sensor is uniform over the scanned portion of the FOV.

8. A method of optical non-uniformity correction (NUC) of an active mode imaging sensor having a field-of-view (FOV), the method comprising:

transmitting a laser spot that is smaller than the sensor's field of view (FOV);

scanning the laser spot over a portion of the FOV in an overlapping geometrical pattern relative to a line-of-sight of the imager over the FOV within a frame time while modulating as a function of the scan position of the laser spot a spacing between overlapping laser spots, a size of the laser spot, a dwell time of the laser spot or the energy of the laser spot or combinations thereof so that a net response of the sensor is uniform over the scanned portion of the FOV.

9. A method of optical non-uniformity correction (NUC) of an active mode imaging sensor having a field-of-view (FOV), wherein the sensor comprises a liquid crystal waveguide having a core and at least one cladding, liquid crystal material within said at least one cladding and at least one electrode and a ground plane on opposite sides of the liquid crystal material, the method comprising:

transmitting a laser spot that is smaller than the sensor's field of view (FOV);

applying at least one time-varying voltage to said at least one electrode to vary an electric field to induce said liquid crystal material to form a time-varying refractive shape to form and scan the laser spot over a portion of the FOV so that a net response of the sensor is uniform over the scanned portion of the FOV.

10. The method of claim 1, wherein the size of the laser spot is less than 25% of the FOV.

11. The method of claim 1, further comprising scanning the laser spot to increase the SNR in a local region of the FOV.

12. The method of claim 1, wherein the sensor comprises a pixelated imager having fixed pattern noise, comprising forming the laser spot with the size of an individual pixel and scanning the laser spot to compensate for the fixed pattern noise in a local region of the FOV.

13. The method of claim 1, wherein the scanned portion of the FOV is less than the entire FOV.

* * * * *